(12) United States Patent
Miyaji et al.

(10) Patent No.: US 9,601,004 B2
(45) Date of Patent: Mar. 21, 2017

(54) SYSTEM AND METHOD FOR ESTIMATING ENERGY CONSUMPTION BASED ON READINGS FROM AN AMI NETWORK

(75) Inventors: Wendell Miyaji, Norcross, GA (US); John Rossi, Norcross, GA (US)

(73) Assignee: COMVERGE, INC., Norcross, GA (US)

( * ) Notice: Subject to any disclaimer, the term of this patent is extended or adjusted under 35 U.S.C. 154(b) by 630 days.

(21) Appl. No.: 13/532,160

(22) Filed: Jun. 25, 2012

(65) Prior Publication Data

US 2013/0342359 A1 Dec. 26, 2013

(51) Int. Cl.
| | |
|---|---|
| *G08C 15/06* | (2006.01) |
| *G08C 19/20* | (2006.01) |
| *G08C 19/22* | (2006.01) |
| *H04Q 9/00* | (2006.01) |
| *G01R 19/00* | (2006.01) |
| *G01R 11/63* | (2006.01) |
| *G08C 17/02* | (2006.01) |
| *G01D 4/00* | (2006.01) |

(52) U.S. Cl.
CPC .............. *G08C 17/02* (2013.01); *G01D 4/002* (2013.01); *Y02B 90/241* (2013.01); *Y02B 90/244* (2013.01); *Y02B 90/246* (2013.01); *Y04S 20/32* (2013.01); *Y04S 20/327* (2013.01); *Y04S 20/42* (2013.01)

(58) Field of Classification Search
CPC ........ G01R 21/00; G01R 22/00; G01R 22/06; G06F 1/28

See application file for complete search history.

(56) References Cited

U.S. PATENT DOCUMENTS

| 6,388,564 B1 | 5/2002 | Piercy et al. |
| 8,401,807 B2 | 3/2013 | Quittek et al. |
| | (Continued) | |

FOREIGN PATENT DOCUMENTS

| JP | 2010-122176 | * | 6/2010 |
| JP | 2010122176 | A | 6/2010 |
| KR | 101135985 | B1 | 4/2012 |

OTHER PUBLICATIONS

PCT ISR for PCT/US2012/044010, Mailed Feb. 26, 2013, Korean Patent Office Action as International Searching Authority and International Preliminary Examining Authority; 10 pages—1NPL, 2 FOR refs, 2 US refs.

(Continued)

*Primary Examiner* — Firmin Backer
*Assistant Examiner* — Jerold Murphy
(74) *Attorney, Agent, or Firm* — Smith Tempel; Steven P. Wigmore

(57) ABSTRACT

A method and system for estimating energy consumption of a utility population includes organizing the utility population comprising energy consumers into a plurality of groups. Next, a distribution of energy consumption against the plurality of groups may be calculated. Subsequently, statistically representative groups based on the energy distribution and the plurality of groups may be determined. Data is then collected from the statistically representative groups at predefined intervals from a communications network. Energy consumption of the utility population may then be estimated based on the data collected from the statistically representative groups. The communications network comprises an advanced metering infrastructure (AMI) network.

20 Claims, 9 Drawing Sheets

(56) References Cited

U.S. PATENT DOCUMENTS

| | | |
|---|---|---|
| 2003/0050737 A1 | 3/2003 | Osann |
| 2004/0174271 A1 | 9/2004 | Welles, II et al. |
| 2005/0055586 A1 | 3/2005 | Flen et al. |
| 2005/0065742 A1 | 3/2005 | Rodgers |
| 2007/0013547 A1 | 1/2007 | Boaz |
| 2007/0018850 A1 | 1/2007 | Flen et al. |
| 2007/0063866 A1 | 3/2007 | Webb |
| 2008/0071911 A1 | 3/2008 | Holbrook et al. |
| 2008/0147243 A1 | 6/2008 | Rodgers |
| 2009/0055032 A1 | 2/2009 | Rodgers |
| 2009/0102680 A1 | 4/2009 | Roos |
| 2010/0026479 A1 | 2/2010 | Tran |
| 2010/0082172 A1 | 4/2010 | Ko et al. |
| 2010/0106342 A1 | 4/2010 | Ko et al. |
| 2010/0217651 A1 | 8/2010 | Crabtree et al. |
| 2010/0250590 A1 | 9/2010 | Galvin |
| 2010/0332373 A1 | 12/2010 | Crabtree et al. |
| 2011/0125422 A1 | 5/2011 | Goncalves Jota et al. |
| 2012/0136496 A1* | 5/2012 | Black .................. H02J 3/14 700/291 |
| 2013/0238266 A1* | 9/2013 | Savvides ............ G06Q 50/06 702/61 |

OTHER PUBLICATIONS

Murnay, C. et al. "Effectiveness of antithetic sampling and stratified sampling in Monte Carlo chronological production cost modeling," IEEE Transactions on Power Systems, vol. 6, No. 2, May 1991, pp. 669-675 see abstract and p. 672.

* cited by examiner

SYSTEM AND METHOD FOR ESTIMATING ENERGY CONSUMPTION BASED ON READINGS FROM AN AMI NETWORK

BACKGROUND

Demand Response (DR) is a utility or electrical provider program to reduce load, on command, by curtailing the use of non-critical end-use loads. Demand Response programs may be deployed to most customer classes. Of particular value are programs that curtail residential Heating, Ventilation and Air Conditioning (HVAC) systems during times of peak usage. This is true since electrical system peaks are often caused by high usage of Residential HVAC systems.

Demand Response programs usually include an electrical load management system that controls the amount of electrical energy used by HVAC loads during peak energy demand periods. The control signals issued by the load management system usually cause electrical load reductions. Such load reductions are commonly referred to in the industry as load shedding. Load shedding is usually the more cost effective alternative to investing in expensive additional power generating capacity. Devices that are used to produce additional power generating capacity at times of high usage are often referred to in the industry as "peakers."

As of this writing, many utility providers have turned to load shedding as the most viable option to address very high peak demands instead of purchasing peakers. Load shedding usually comprises "direct load control" or demand response programs. Direct load control is a method where utility providers may interrupt the loads of their consumers during critical energy demand times.

Many utilities target Residential and Small Commercial HVAC loads for reduction during peak periods. Two key attributes of a Demand Response program that make this resource more valuable to system operators are as follows: (1) the ability to estimate available load prior to a load control event and (2) to verify load drop during the event.

A typical approach for estimating demand response is to collect the load profile data from an energy meter on non-event days. Then the difference between this baseline load profile and the energy use as measured by the same meter during the event constitutes the demand response reduction realized by that participant. Ideally this difference would be totaled for all of the participants.

Recently, meter reading networks are being deployed to most utility customers, including residential and small commercial customers. Since these Advanced Metering Infrastructure (AMI) networks usually collect meter data from all of the meters for a utility, it is often assumed by utility providers that this data can be used for measuring and verification (M&V).

However, this whole population summation is not practical due to limitations on network meter reading speed. The network bandwidth and architecture of many AMI networks, especially those which use power line carrier (PLC) or RF-based mesh networks, usually will not support retrieving information from the entire population, or a substantial percentage of the entire population, in a short period time, such as over a period of a few hours in order to provide energy analysis after a load shedding event. Usually, data from meters is usually needed within minutes for load drop estimates during a load shedding event. Typically, it takes many hours to receive data from each and every program participant's meter, which could number in the 100's of thousands, within an AMI network.

What is needed in the art is an accurate estimate of the demand response in near real time using data from an AMI network. Collecting information from utility meters over an AMI network may be valuable both prior to a control event to assess potential energy savings as well as during and after a control event to assess delivered energy. A need exists in the art for a method and system that balances the utilization of the network bandwidth against the requirement that information for a demand response event is collected in real time or near real time at granular levels, such as on a sub-hourly or minute-by-minute basis.

SUMMARY OF THE DISCLOSURE

A sampling method and system is proposed that may work effectively with AMI networks, especially those of limited bandwidth. One goal of the method and system is to form multiple sets of statistically valid samples that can be spread over time each of which provides independent population estimates each time a set is read and relayed to the central processor.

More specifically, a method and system for estimating energy consumption of a subset of the utility population that participates in a demand response program includes organizing the participants into a plurality of statistically similar groups. Next, a distribution of energy consumption against the plurality of groups may be calculated using meter data. Subsequently, statistically representative groups based on the distribution and the plurality of groups may be determined. Data is then collected from the statistically representative groups at predefined intervals from a communications network. Energy consumption of the utility population or that subset of all customers participating in a demand response program may then be estimated based on the data collected from each of the statistically representative groups. The communications network may comprise an advanced metering infrastructure (AMI) network, which collects data from the population.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

DETAILED DESCRIPTION

Figure 1A:
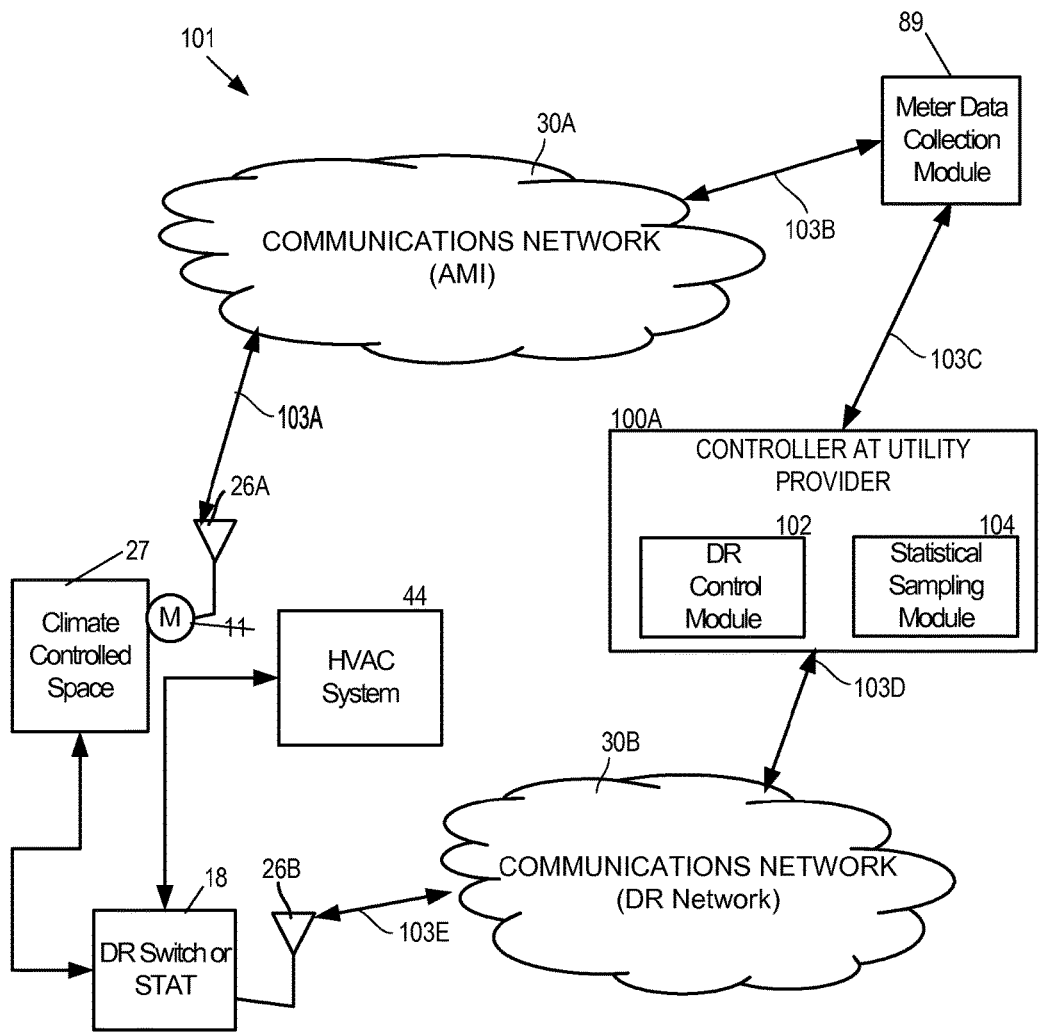
FIG. 1A is a diagram of a single residence AMI and DR system that includes central controllers at a utility provider coupled to an AMI network and a demand response network.

Referring initially to FIG. 1A, this figure is a diagram of a system 101 that includes a meter data collection module 89 for a utility provider coupled to an AMI network 30A. The AMI network 30A may include and/or communicate with a meter 11 equipped with an antenna 26A (or alternatively, a wired connection not illustrated). The meter 11 measures the utility consumption (i.e. electricity, gas, and/or water) consumption of a climate controlled space 27. The climate controlled space 27 may comprise any type of room or volume which is fully closed off or partially closed off relative to the outside. The climate controlled space 27 may comprise a single room or a plurality of rooms joined together by an air ventilation system.

According to the exemplary embodiment illustrated in FIG. 1A, the meter 11 measures electrical consumption of a climate controlled space 27 such as a building. However, the system 101 is not limited to only electrical meters 11 and may employ other meters 11 for measuring other utility consumption as understood by one of ordinary skill in the art.

The utility infrastructure (i.e. power lines) of the climate controlled space 27 is coupled to a demand response (DR) switch and/or a thermostat 18. The demand response switch 18 may comprise a digital control unit (DCU) sold as of this writing by Comverge, Inc. of Norcross, Ga. The thermostat 18 may comprise a programmable digital thermostat that supports features such as user-defined time and temperature setbacks and/or price signal responses. Such a digital thermostat 18 is also sold as of this writing by Comverge, Inc. of Norcross, Ga. As understood by one of ordinary skill in the art, a climate controlled space 27 may have more than one HVAC system 44 to heat and/or cool it.

For the remainder of this document, DR switch 18 will only be referred to in this description of the system 101. However, one of ordinary skill in the art will appreciate that the DR switch 18 may be substituted with the thermostat 18. Further, a customer premise may include both a DR switch and a thermostat 18.

An HVAC system 44 may be coupled to the DR switch or thermostat 18. The HVAC system 44 may comprise heating, ventilating, and air-conditioning (HVAC) equipment. Such equipment may include, but is not limited to, furnaces, heat pumps, central air conditioners, window unit air conditioners, and the like. The DR switch 18 is coupled to a DR communications network 30B via an antenna 26B (or alternatively, a wired connection not illustrated).

While FIG. 1A and the remaining figures illustrate AMI networks 30A and DR networks 30B as an example, the principles of the system 101 hold for any type of communications network. Such other networks 30 may be wired or wireless as understood by one of ordinary skill in the art.

The communication links 103 illustrated in FIG. 1A may comprise wired or wireless communication links. Wireless communication links include, but are not limited to, radio-frequency ("RF") links, infrared links, acoustic links, and other wireless mediums. The communications networks 30 may comprise a wide area network ("WAN"), a local area network ("LAN"), the Internet, a Public Switched Telephony Network ("PSTN"), a power lines communication ("PLC") network, or any combination thereof. The DR Communications network 30B can be one way (to the DR switch 18) or two way and the DR communications can share the AMI communications network 30A.

The communications networks 30 may be established by broadcast RF transceiver towers 28. However, one of ordinary skill in the art recognizes that other types of communication devices besides broadcast RF transceiver towers 28 are included within the scope of the system 101 for establishing the communications network 30.

The exemplary wireless communication networks 30 of FIG. 1A may employ wireless communications towers 28 (See FIG. 1C) which couple to the antennas 26B of the DR switch 18 and meters 11 which also have antennas 26A. The meters 11 coupled to each HVAC system 44 may communicate with one another with their antennas 26A and they may help form the AMI network 30A. The AMI 30A network may be configured as a mesh network 30A.

A mesh network 30A, as understood by one of ordinary skill in the art, is a type of network where each node (i.e. —each meter 11 with antenna 26A) not only captures and disseminates its own data, but also serves as a relay for other nodes, that is, it must collaborate to propagate the data in the network 30A.

A mesh network 30A may be designed using a flooding technique or a routing technique. When using a routing technique, the mesh network 30A propagates messages along a path, by hopping from node to node (i.e. —antenna 26A of one meter 11 to antenna 26A of another meter 11) until the destination is reached. Such a mesh network 30A formed among meters 11 using their antennas 26A is illustrated in FIG. 1C.

To ensure all its paths' availability, the mesh network 30A usually must allow for continuous connections and reconfiguration around broken or blocked paths, using self-healing algorithms. A mesh network 30A whose nodes (in which each node includes an antenna 26 of a meter 11) are all connected to each other is characterized as a fully connected network 30A.

Referring back to FIG. 1A, this figure further illustrates that the central controller 100A at a utility provider may comprises a DR control module 102 and a DR statistical sampling module 104. The central controller 100A is coupled to the meter data collection module 89 described above. The modules 102, 104 of the central controller 100A may comprise software or hardware (or both). Further details of the statistical sampling module 104 will be described below in connection with FIGS. 2 through 5.

Figure 1B:
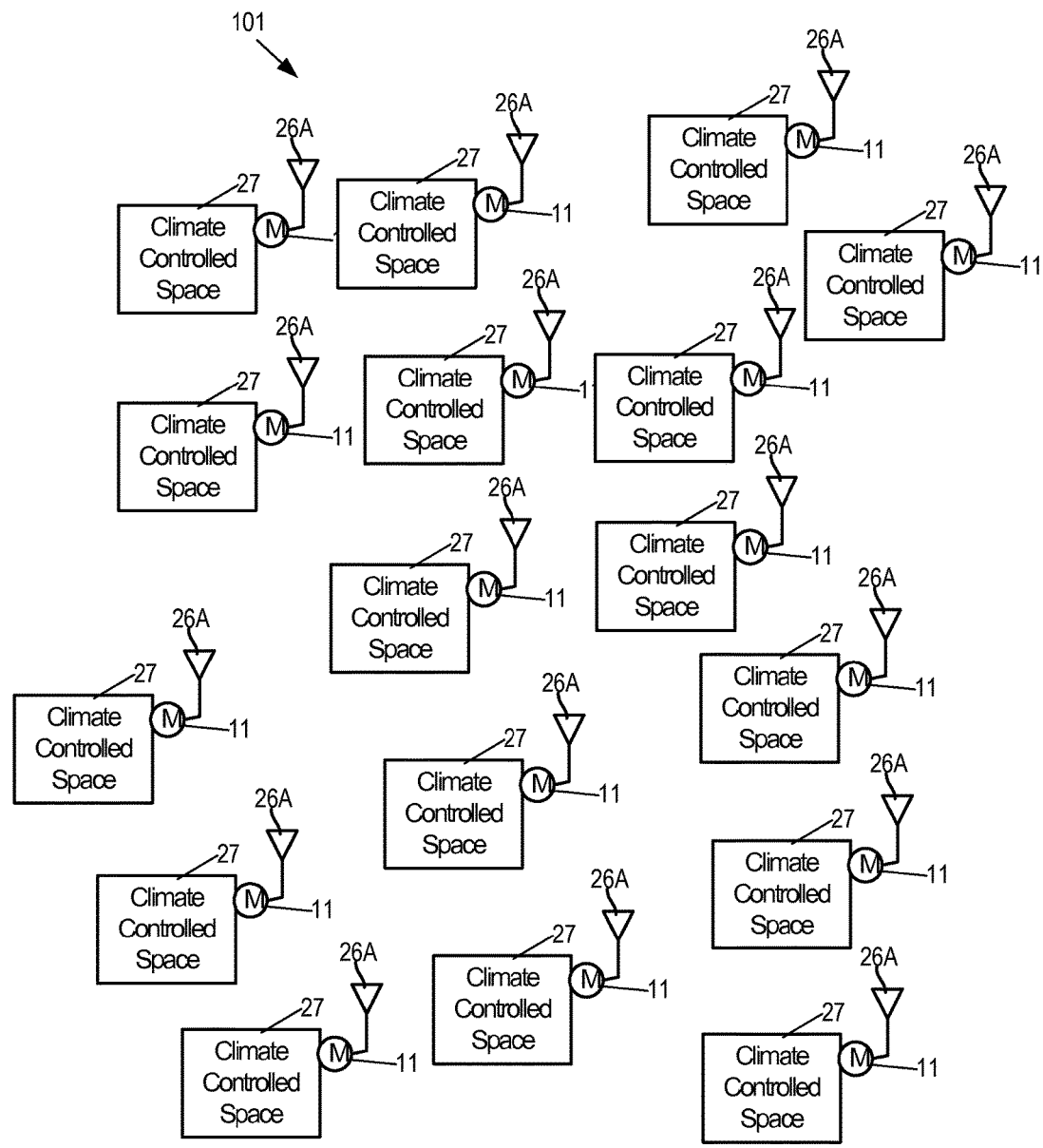
FIG. 1B is a diagram of a population of customers corresponding to FIG. 1A in which each customer is connected to the AMI and DR networks.
Figure 1C:
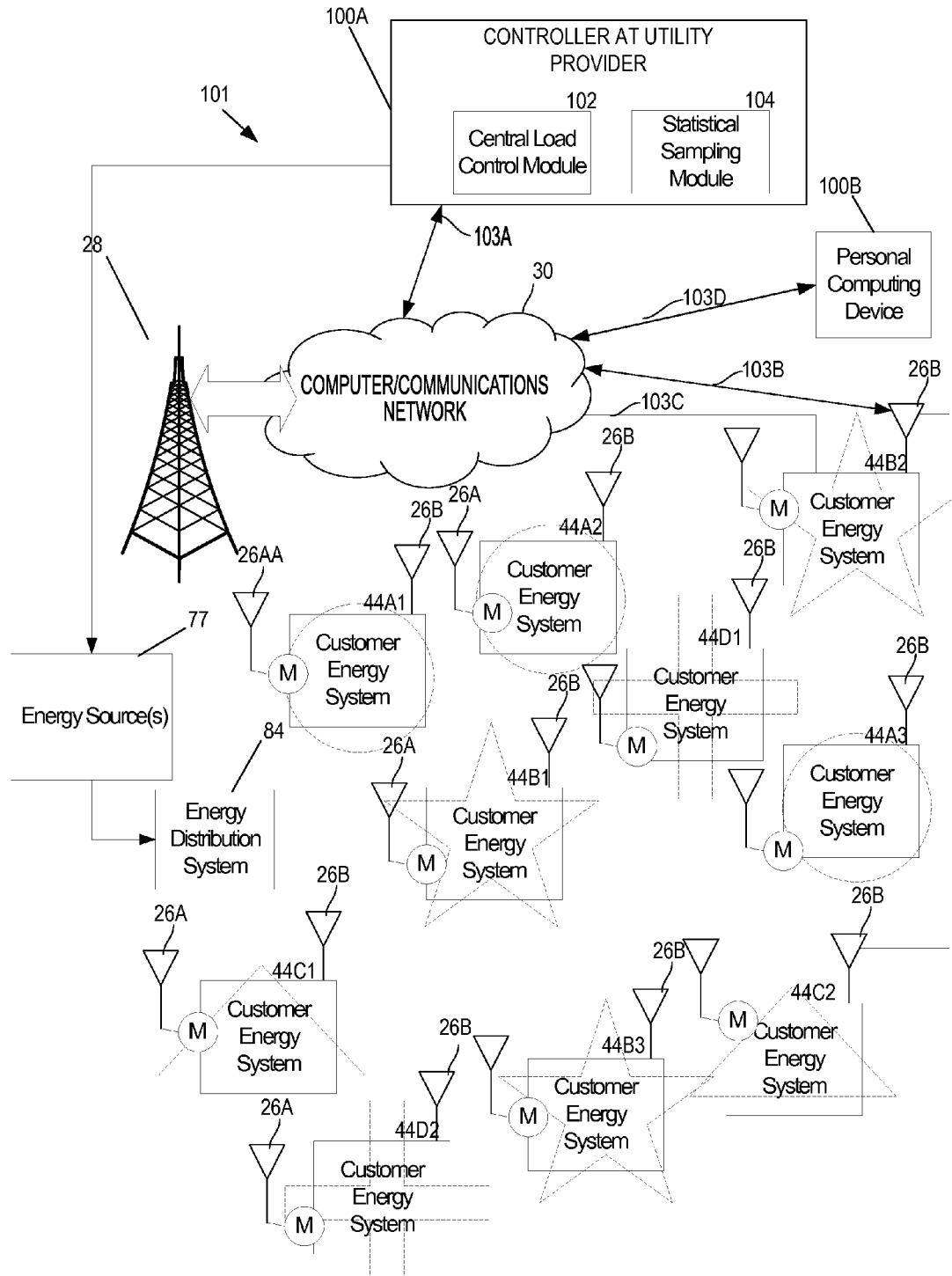
FIG. 1C is diagram of the system of FIG. 1B in which HVAC systems of energy consumers have been highlighted with symbols to represent different energy consumption rates and energy profiles.

FIG. 1B is a diagram of a population of customers having climate controlled spaces 27 corresponding to FIG. 1A in which each customer is connected to the AMI and DR networks. Details such as the HVAC systems 44, meters 11, and DR switches 18 have not been illustrated for brevity but are present for each climate controlled space 27. FIG. 1B demonstrates the immense volume of customers that may be generating data and which may be tracked by the system 101. The customers may comprise residential customers and/or commercial/industrial customers. The loads may comprise those other than HVAC loads, like industrial loads from industrial customers such as factories, or a combination of HVAC and other types of loads. It is clear to one of ordinary skill in the art that the system 101 may be applied all types of controlled loads, whether commercial/industrial or residential, and any combination thereof.

Referring now to FIG. 1C, this figure is diagram of the system 101 of FIG. 1A in which HVAC systems 44 have been marked with various symbols to represent different energy consumption rates and energy profiles. The symbols include a circle shape, a star shape, a triangle shape, and a cross shape.

A first set of HVAC systems 44A have been assigned the symbol of a circle. A second set of HVAC systems 44B have been assigned the symbol of a star. A third set of HVAC systems 44C have been assigned the symbol of a triangle. And a fourth set of HVAC systems 44D have been assigned the symbol of a cross.

These different symbols were assigned to illustrate that each HVAC system 44 may have shared energy characteristics among groups within a utility population. There may be several different groups within the utility population. Energy characteristics of each HVAC system 44 that may be tracked by a utility provider may include, but are not limited to, energy consumption of a HVAC system 44, types of HVAC equipment, sizes of HVAC equipment, age of HVAC equipment, percentage of exposure to sunlight for each climate controlled space coupled to the HVAC equipment for a particular HVAC system, the size of each climate controlled space for a particular HVAC system, and other similar parameters as understood by one of ordinary skill in the art. With these different parameters, a utility provider may characterize its utility population for generating statistically representative samples as will be described in further detail below in connection with FIGS. 2A-2B.

For example, each HVAC system 44A of the first set or group having the circle symbol may comprise three-ton cooling systems. Meanwhile, each HVAC system 44B of the second set or group having the star symbol may comprise less than three-ton cooling systems. And so on.

The central controller 100A of the utility provider is also coupled via the electric grid to one or more energy sources 77. The energy sources 77 may include, but are not limited to, nuclear power, wind power, solar power, geothermal power, hydroelectric power, and fossil fuelled power plants such as, but not limited to, coal-fired power stations, renewable energy plants or biomass-fuelled power plants, combined cycle plants, internal combustion reciprocating engine power plants, etc.

An energy distribution system 84 may be coupled to the regular and surplus energy sources 77 and the switch 18. The energy distribution system 84 may comprise components for distributing and managing electrical energy. In such an exemplary embodiment, the energy distribution system 84 may comprise a network that carries electricity from a transmission system and delivers it to consumers. Typically, the network would include medium-voltage (less than 50 kV) power lines, electrical substations and pole-mounted transformers, low-voltage (less than 1 kV) distribution wiring and sometimes electricity meters.

The personal computing device 100B which is coupled to the communication is network 30 may comprise a general purpose computer that may be operated by a utility provider to issue commands directly to the customer premise control system 10. Alternatively, the personal computing device 100B may be operated by a utility provider for issuing commands to the central controller 100A at the utility provider. In this description, the personal computing device 100B may include a cellular telephone, a pager, a portable digital assistant ("PDA"), a smartphone, a navigation device, a hand-held computer with a wireless connection or link, a lap-top, a desk top, or any other similar computing device.

The controller 100A at the utility provider may comprise a computer server that includes a demand response (DR) control module 102. The DR control module 102 may comprise software or hardware (or both) as understood by one of ordinary skill in the art. The DR control module 102 may issue commands that include load control parameters which are sent over the DR communications network 30B to the DR switches or thermostats 18. Such load control parameters may include, but are not limited to, the total duration of a utility cycling control event and a duty cycle that defines the ratio of power removed from the space conditioning load and power provided to the conditioning load over a predefined period.

The DR control module 102 may calibrate a select number of climate controlled spaces 27. The DR control module 102 may transmit its commands over the communications network 30B as load control parameters.

The central controller 100A of the utility provider and further comprise a DR statistical sampling module 104. The statistical sampling module 104 may work in combination with the DR control module 102 and/or the meter data collection module 89 in order to perform a method 400 for estimating energy consumption from an AMI network 30A as will be described in further detail below in connection with FIG. 4. Like the DR control module 102, the statistical sampling module 104 may comprise software or hardware or both.

Figure 1D:
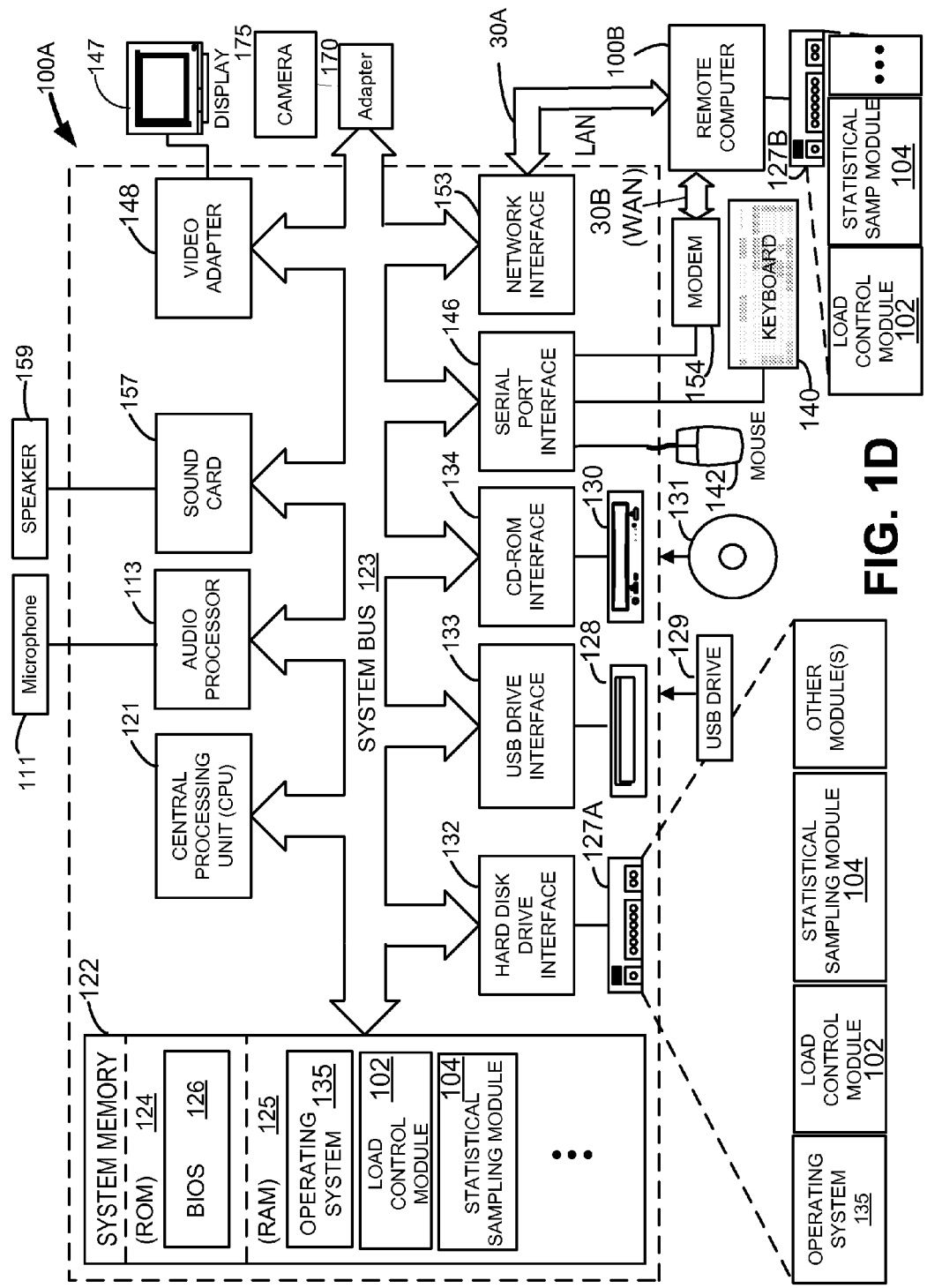
FIG. 1D is a diagram illustrating further details of an exemplary central controller of FIG. 1A.

FIG. 1D is a diagram of the main components for an exemplary central controller 100A at the utility provider illustrated in FIG. 1A. The exemplary operating environment for the central controller 100A includes a general-purpose computing device in the form of a conventional computer.

Generally, the computer forming the central controller 100A includes a central processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes a read-only memory ("ROM") 124 and a random access memory ("RAM") 125. A basic input/output system ("BIOS") 126, containing the basic routines that help to transfer information between elements within computer, such as during start-up, is stored in ROM 124.

The computer 100A may include a hard disk drive 127A for reading from and writing to a hard disk, not shown, a USB port 128 for reading from or writing to a removable USB drive 129, and an optical disk drive 130 for reading from or writing to a removable optical disk 131 such as a CD-ROM, a DVD, or other optical media. Hard disk drive 127A, USB drive 129, and optical disk drive 130 are connected to system bus 123 by a hard disk drive interface 132, a USB drive interface 133, and an optical disk drive interface 134, respectively.

Although the exemplary environment described herein employs hard disk 127A, removable USB drive 129, and removable optical disk 131, it should be appreciated by one of ordinary skill in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the system 101. Such uses of other forms of computer readable media besides the hardware illustrated will be used in internet connected devices.

The drives and their associated computer readable media illustrated in FIG. 1D provide nonvolatile storage of computer-executable instructions, data structures, program modules, and other data for computer or client device 100A. A number of program modules may be stored on hard disk 127, USB drive 129, optical disk 131, ROM 124, or RAM 125, including, but not limited to, an operating system 135, the DR control module 102, and the statistical sampling module 104. Details about the statistical sampling module 104 will be described below in connection with FIG. 4. Each program module may include routines, sub-routines, programs, objects, components, data structures, etc., which perform particular tasks or implement particular abstract data types.

A user may enter commands and information into the computer through input devices, such as a keyboard 140 and a pointing device 142. Pointing devices may include a mouse, a trackball, and an electronic pen that can be used in conjunction with an electronic tablet. Other input devices (not shown) may include a joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. As noted above, the display 147 can comprise any type of display devices such as a liquid crystal display (LCD), a plasma display, an organic light-emitting diode (OLED) display, and a cathode ray tube (CRT) display.

A camera 175 may also be connected to system bus 123 via an interface, such as an adapter 170. The camera 175 may comprise a video camera. The camera 175 can be a CCD (charge-coupled device) camera or a CMOS (complementary metal-oxide-semiconductor) camera. In addition to the monitor 147 and camera 175, the client device 100A, comprising a computer, may include other peripheral output devices (not shown), such as a printer.

The computer may also include a microphone 111 that is coupled to the system bus 123 via an audio processor 113 is understood by one of ordinary skill in the art. A microphone 111 may be used in combination with a voice recognition module (not illustrated) in order to process audible commands received from an operator. A speaker 159 may be provided which is coupled to a soundcard 157. The soundcard 157 may be coupled to the system bus 123.

The computer forming the central controller 100A may operate in a networked environment using logical connections to one or more remote computers, such as a web server. A remote computer 100B may be another personal computer, a server, a mobile phone, a router, a networked PC, a peer device, or other common network node. While the web server or a remote computer 100B typically includes many or all of the elements described above relative to central controller 100A, only a memory storage device 127B has been illustrated in this FIG. 1B. The logical connections depicted in FIG. 1D include a local area network (LAN) 30A and a wide area network (WAN) 30B. Such networking environments are commonplace in offices, enterprise-wide computer networks, intranets, and the Internet.

When used in a LAN networking environment, the computer forming the central controller 100A is often connected to the local area network 30A through a network interface or adapter 153. When used in a WAN networking environment, the computer typically includes a modem 154 or other means for establishing communications over WAN 30B, such as the Internet. Modem 154, which may be internal or external, is connected to system bus 123 via serial port interface 146. In a networked environment, program modules depicted relative to the server 100B, or portions thereof, may be stored in the remote memory storage device 127A. It will be appreciated that the network connections shown are exemplary and other means of establishing a communications link between the computers may be used.

Moreover, those skilled in the art will appreciate that the system 101 may be implemented in other computer system configurations, including hand-held devices, multiprocessor systems, microprocessor based or programmable consumer electronics, network personal computers, minicomputers, mainframe computers, and the like. The system 101 may also be practiced in distributed computing environments, where tasks are performed by remote processing devices that are linked through a communications network. In a distributed computing environment, program modules may be located in both local and remote memory storage devices.

Figure 2A:
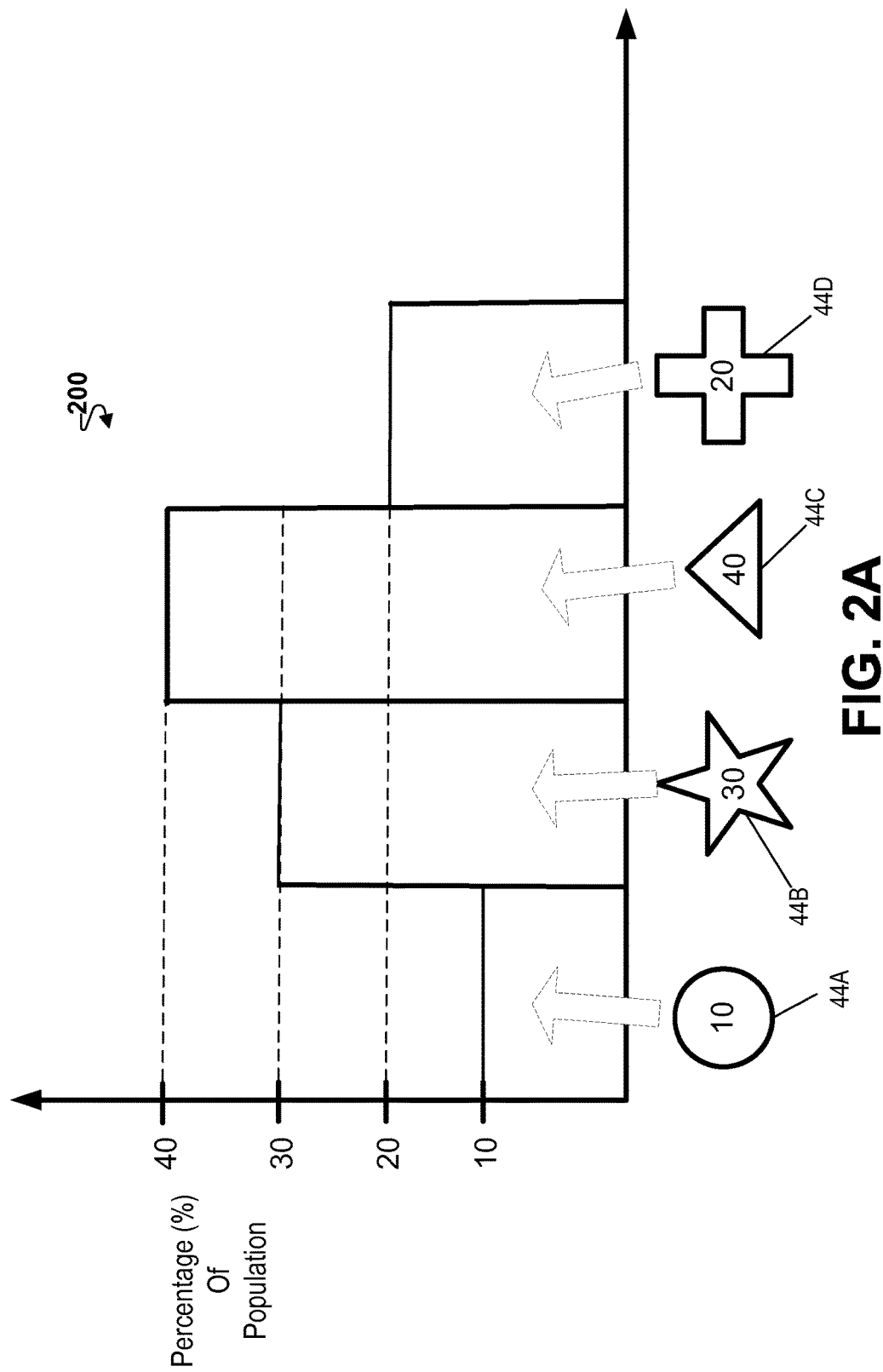
FIG. 2A is a histogram that plots various energy consumers as a percentage of the total population of participants.

FIG. 2A is a histogram 200 that includes a distribution plot of energy consumers with central air conditioning ("ac") for a utility participant population based on the characteristics of their ac usage. These characteristics could include the size and efficiency of each ac unit and the square footage of the building or other parameters that indicate the likely ac power usage.

The X-axis of the graph 200 arbitrarily lists four different customer segments into which the population can be subdivided. Each group is represented by a shape, similar to the shapes described above in connection with FIG. 1C. The Y-axis of the graph 200 provides the percent of the total population represented by that segment. For example, forty percent of the population is grouped into the triangle shape. The population can be represented, from a sampling perspective by forming a sample from the appropriate numbers for each of the groups.

For example, a sample made up of ten circles, thirty stars, forty triangles and twenty crosses could be used to represent the entire population. Note that the ratios of each shape should remain the same but the total sample size can be scaled to change the amount of error between the sample and the population.

HVAC systems 44 that have a first set of similar characteristics which may include, but are not limited to, types of HVAC equipment and energy consumption rate, have been assigned to a first group 44A which has a symbol of a circle. Similarly, HVAC systems 44 that have a second set of similar characteristics have been assigned to a second group 44B which has a symbol of a five pointed star.

HVAC systems 44 that have a third set of similar characteristics have been assigned to a third group 44C which has a symbol of a triangle. HVAC systems 44 that have a fourth set of similar characteristics have been assigned to a fourth group 44D which has a symbol of a cross.

Figure 2B:
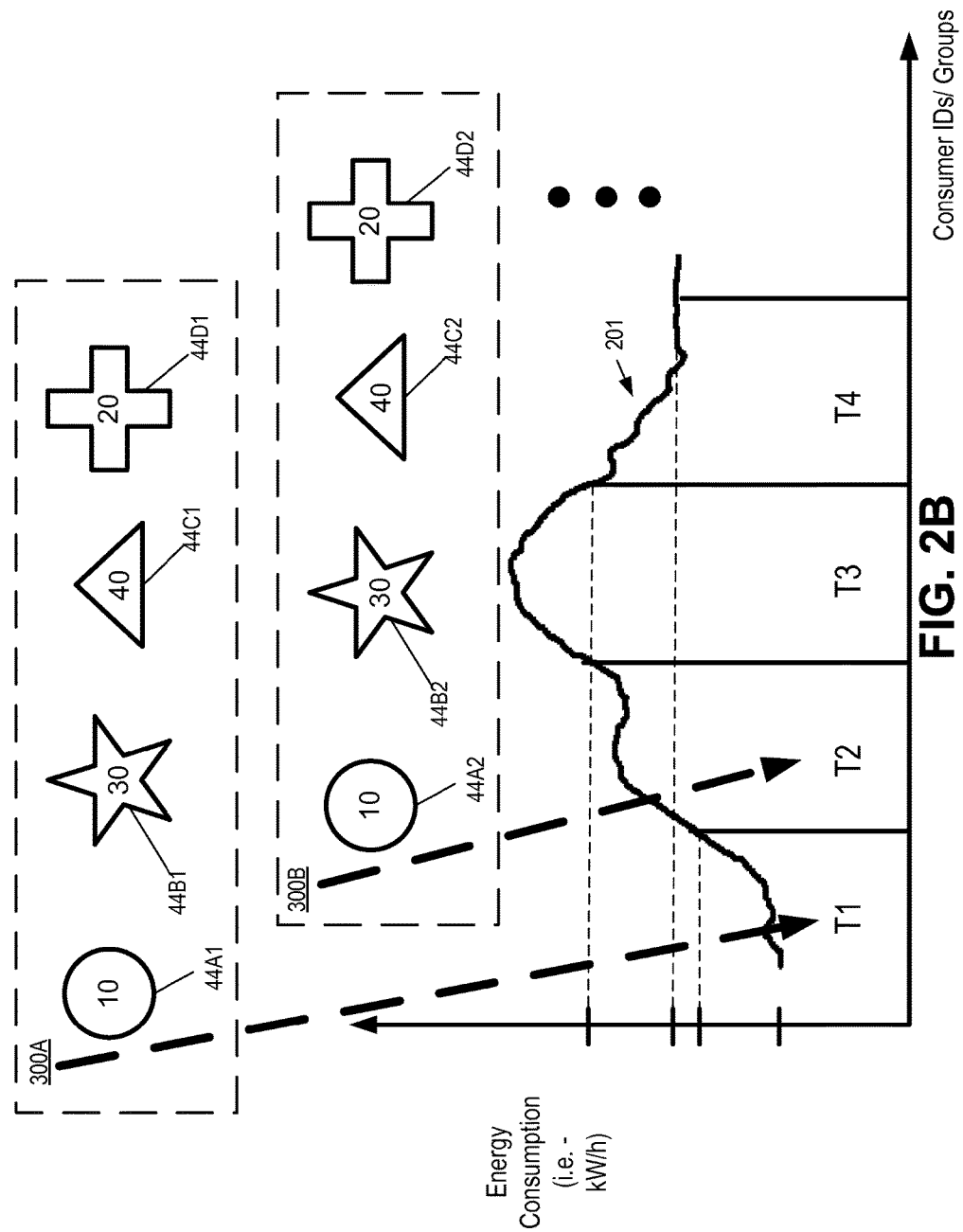
FIG. 2B is a graph that includes a distribution plot of energy consumers for a utility population based on energy consumption.

Referring to FIG. 2B, a line graph 201 may represent a current consumption of all energy customers at a particular time. The Y-axis may track energy consumption in kWh while the X-axis tracks time.

The statistical sampling module 104 of the central controller 100A may determine the ratio of the number of members relative to each of the four groups illustrated in FIG. 2B. In the exemplary embodiment of FIG. 2B, the ratio of the number of members relative to each of the four groups as illustrated in the exemplary embodiment of FIG. 2B is as follows: 1:3:4:2.

This means that if the statistical sampling module 104 uses this ratio of 1:3:4:2 for selecting members from each group of the four groups, then the statistical sampling module 104 may be able to form statistically representative samples, such as samples 300A and 300B that comprise one-hundred members each, that are much smaller than the total utility population. So in FIG. 2B, a first sample 300A may comprise one-hundred members made of ten members represented by circles 44A1, thirty members represented by stars 44B1, forty members represented by triangles 44C1, and twenty members represented by crosses 44D1.

Similarly, the second sample 300B of FIG. 2B may comprise one-hundred members made of ten members represented by circles 44A2, thirty members represented by stars 44B2, forty members represented by triangles 44C2, and twenty members represented by crosses 44D2.

From these statistically representative samples, the central controller 100A may be able to collect data without consuming significant bandwidth in an AMI network when data is polled on very granular levels, such as hourly, for a set period of minutes less than an hour, or on a minute-by-minute basis. For example, the first sample 300A may be assigned to a time period T1, while the second sample is assigned to a time period T2, and so on.

Specifically, FIG. 2B shows the load for a total population over four time intervals. In each interval, a different sample comprising the appropriate numbers of each shape may be selected, summed and scaled to approximate the behavior of the population. For example, if the population is 100,000 air conditioners and 100 shapes in the proper relative proportions (i.e. 10, 30, 40, 20) are sampled then the sample sum multiplied by 100,000/100 will be a close approximation to the actual population usage.

Figure 3:
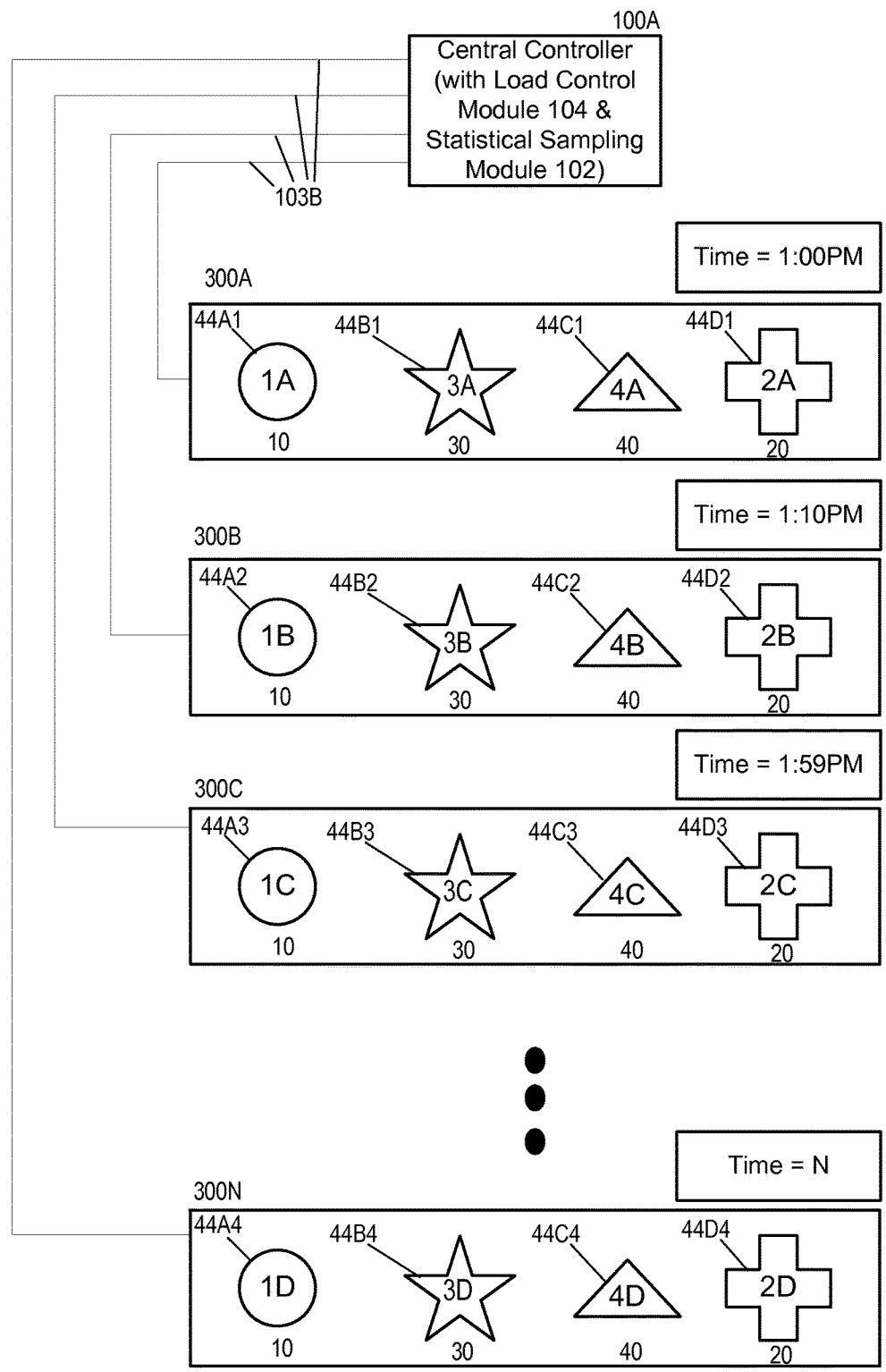
FIG. 3 illustrates how the central controller polls certain statistically representative groups at different predefined times for a selected duration.

FIG. 3 illustrates how the central controller 100A using the statistical sampling module 104 may poll certain statistically representative groups 300A-D at different predefined times for a selected duration. The central controller 100A is coupled via communication links 103B to a first statistically representative group 300A. The communication links 103B may comprise wireless links such as those which are part of a mesh network that may also comprise or be part of an AMI 30A network as described above in connection with FIG. 1.

The first statistically representative group 300A may comprise members from the first group 44A, members from the second group 44B, members from third group 44C, and members from the fourth group 44D. The number of members from each group should correspond to the ratio determined from the distribution plot 200 as illustrated in FIG. 2A. So for the exemplary embodiment illustrated in FIGS. 2A-3A, each statistically representative group 300A should maintain a ratio of 1:3:4:2 among the four groups of HVAC systems 44.

In the exemplary embodiment illustrating FIG. 3A, the predefined times at which the central controller 100A polls each statistically representative group 300 is according to hourly intervals starting from 2:00 PM and so on. One of ordinary skill in the art recognizes that other time intervals besides hourly intervals are within the scope of the system 101 as understood by one of ordinary skill in the art. For example, shorter or more frequent intervals may be employed, such as, but not limited to, weeks, days, every fifteen minutes, every ten minutes, every minute, every second, etc.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

Figure 4:
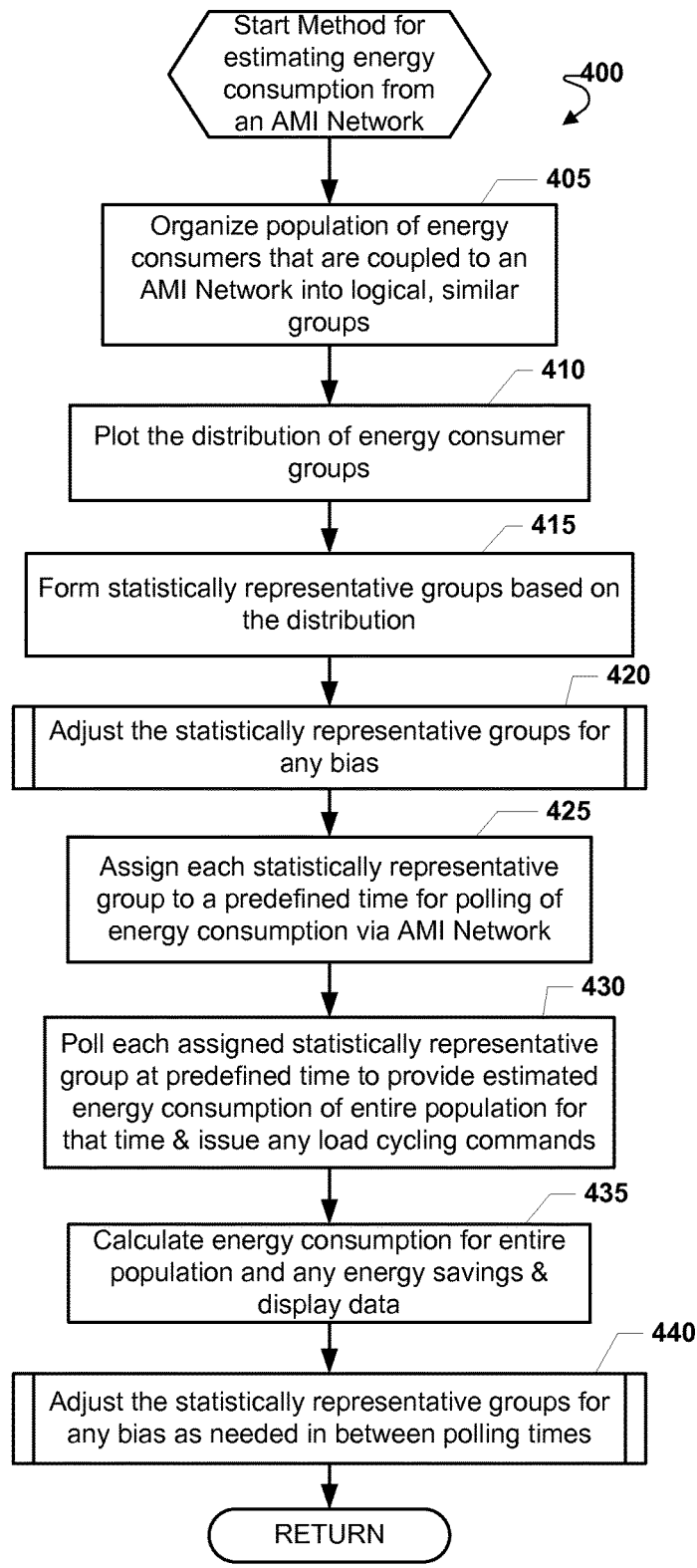
FIG. 4 is a flowchart illustrating a method for estimating energy consumption based on readings from an AMI network.

FIG. 4 is a flowchart illustrating a method 400 for estimating energy consumption based on readings from an AMI network 30A. Step 405 is the first step in the method 400.

In step 405, a population of energy consumers 44 coupled to an AMI network may be organized with a central controller 100A so that the consumers 44 having similar energy characteristics are grouped or categorized together. As noted previously, energy characteristics that may be tracked by a utility provider may include, but are not limited to, energy consumption of a HVAC system 44, types of HVAC equipment, sizes of HVAC equipment, age of HVAC equipment, percentage of exposure to sunlight for each climate controlled space coupled to the HVAC equipment for a particular HVAC system, the size of each climate controlled space for a particular HVAC system, and other similar parameters as understood by one of ordinary skill in the art. With these different parameters, a utility provider may characterize its utility population for generating statistically representative samples as will be described in further detail below.

Next, in step 410, the statistical sampling module 104 of the central controller 100A may plot a distribution of the energy consumer groups formed in Step 405, such as illustrated in FIG. 2A described above. The X-axis of such a distribution may include the HVAC systems 44 listed by an identification number or the like while the Y-axis of the distribution provides the total energy consumption for each HVAC system 44 for some period of time. For example, as illustrated in FIG. 2A, the energy consumption of the Y-axis may be set for energy consumption on a daily level and it may be presented in electrical energy units such as kilowatts per a unit of time such as hours, days, weeks, months, etc (i.e. −kW/h). For other types of energy besides electricity, such as heat, the units for the energy consumption may comprise British Thermal Units (BTUs) per a unit of time such as hours, days, weeks, months, etc.

Next, in step 415, the statistical sampling module 104 may form statistically representative groups based on the distribution that was plotted in step 410. In step 415, the statistical sampling module 104 of the central controller 100A may also determine the ratio of the number of members relative to each of the characterized groups. For example, see the four characterized groups as illustrated in FIG. 2A.

In the exemplary embodiment of FIG. 2B, the ratio of the number of members relative to each of the four groups is as follows: 1:3:4:2. This means that if the statistical sampling module 104 uses this ratio of 1:3:4:2 for selecting members from each group of the four groups, then the statistical sampling module 104 may be able to form statistically representative samples that are by design, significantly much smaller than the total utility population. From these statistically representative samples, the central controller 100A may be able to collect data without consuming significant bandwidth in an AMI network 30A when data is polled on very granular levels, such as hourly, for a set period of minutes less than an hour, or on a minute-by-minute basis.

Next, the statistical sampling module 104 in routine or submethod 420 may adjust the statistically representative groups for any bias. Further details of this routine 420 for adjusting bias within statistically representative groups will be described below in connection with FIG. 5.

After routine 420, the statistical sampling module 104 in step 425 may assign each statistically representative group, such as groups 300A-N of FIG. 3, to a predefined time for polling members in order to receive the current energy consumption via a computer communications network 30. As noted previously, the computer communications network 30 may include an AMI network as understood by one of ordinary skill in the art.

In step 430, each assigned statistically representative group 300 may be polled by the statistical sampling module 104 of the central controller 100A. Also, during step 430, the central load control module 102 may apply cycling commands for initiating and/or ending load shedding for certain members of the utility population. These commands may be communicated across the DR communications network 30B. The energy readings gathered in step 430 may be used by the central controller will 100A to determine the effectiveness of any cycling applied by the central load control module 102 of the central controller 100A. In addition to, or in the alternative to cycling commands, the central load control module 102 may issue commands that provide for a temperature offset to thermostats in at least one of the subgroups for reducing an electrical load.

Next in step 435, the central controller 100A via the load control module 102 or the statistical sampling module 104 (or both) may calculate the energy consumption of the entire population in addition calculating the load drop and potential energy savings due to any cycling commands/thermostat temperature offset commands issued in Step 430. In Step 435, the central controller 100A may display this energy consumption and/or energy savings on a display device, such as the display device 147 as illustrated in FIG. 1D. Thus, the energy readings gathered in step 430 allow the central controller 100A to provide an estimated energy consumption of the entire utility population during each reading since each group is statistically representative of the entire utility population.

Next, in routine or submethod 440, the statistical sampling module 104 may adjust the statistically representative groups 300 for any bias, similar to routine or submethod 420. Submethod 440 is identical to submethod 420 as described above and will be explained in further detail in connection with FIG. 5.

Figure 5:
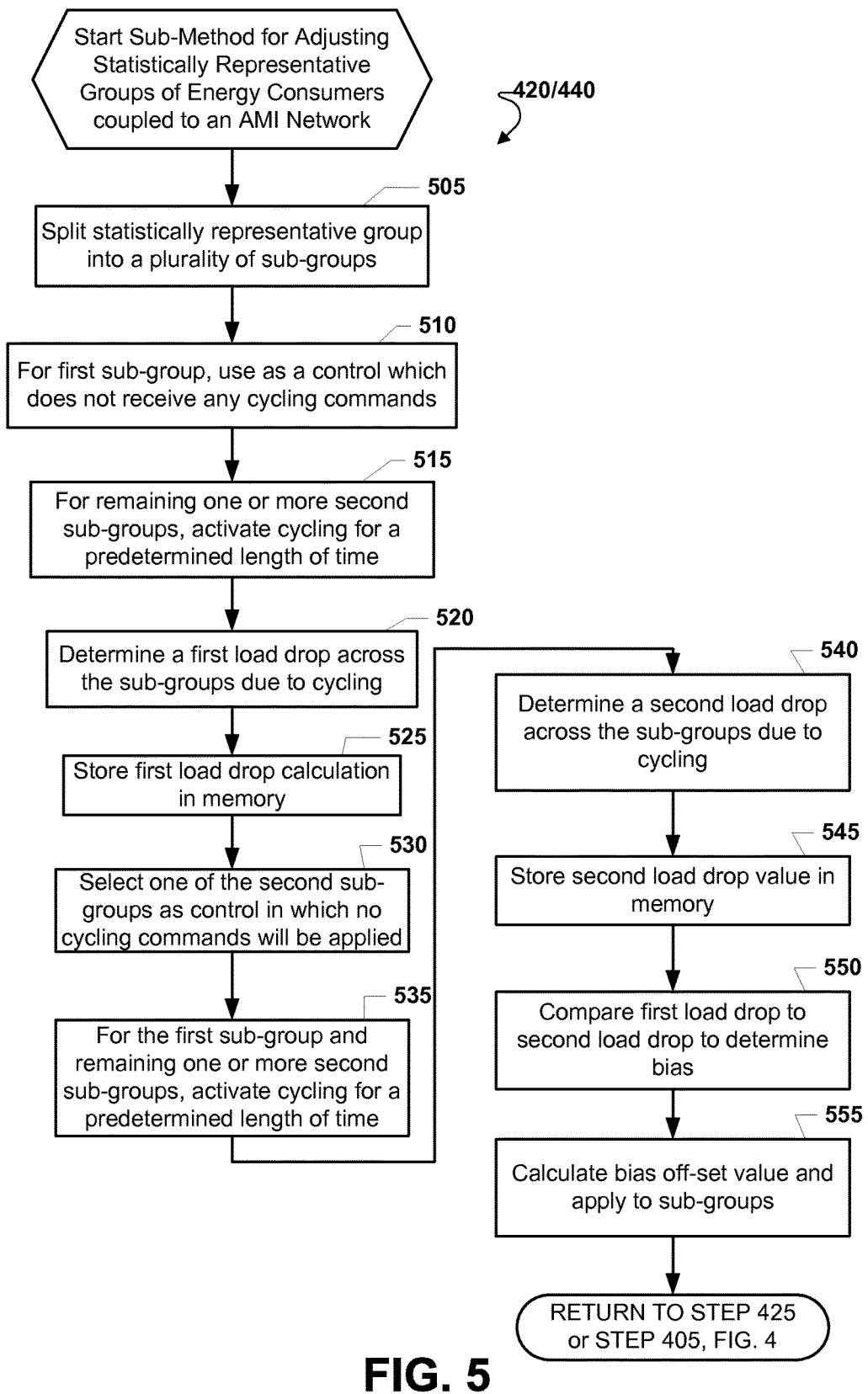
FIG. 5 is a flowchart illustrating a submethod or routine of FIG. 4 for adjusting statistically representative groups for bias.

FIG. 5 is a flowchart illustrating a submethod or routine 420/440 of FIG. 4 for adjusting statistically representative groups 300 for bias. Step 505 is the first step of routine 420/440. In step 505, the statistical sampling module 104 may divide or split a statistically representative group or sample 300A into a plurality of subgroups. After the statistically representative sample 300A has been divided into two or more subgroups in step 505, then in step 510 the statistical sampling module 104 assigns the first subgroup as the control group. The control group in a test will not receive any cycling commands from the central controller 104.

Next, in step 515, for the remaining one or more second subgroups, the central controller 100A via the DR control module 102 or activate cycling for a predetermined length of time, such as, but not limited to, on the order of hours or minutes. Next, in step 520, the central controller 100A via the statistical sampling module 104 will determine a first load drop or energy savings across the subgroups due to the cycling commands/thermostat temperature offset commands issued by the central controller 100A and the load control module 102.

Next, in step 525, the statistical sampling module 104 may store this first load drop calculation in memory, such as on the hard disk drive 127A or in system memory 122 of FIG. 1D. Next, in step 530, the statistical sampling module 104 may select one of the second subgroups as the control for the next cycling test in which no cycling commands/thermostat temperature offset commands will be applied to this control group.

In step 535, for the first subgroup and any remaining second subgroups, the central load controller 100A via the central load control module 102 will activate cycling/thermostat temperature offset among these groups for a predetermined length of time, such as, but not limited to, on the order of hours or minutes. Next, in step 540, the statistical sampling module 104 may determine a second load drop across the subgroups due to the cycling commands/thermostat temperature offset commands applied by the central load controller 100A.

In step 545, the statistical sampling module 104 may store the second load drop value in memory, such as on the hard drive 127 or in the system memory 122 as illustrated in FIG. 1D. Subsequently, in block 550, the statistical sampling module 104 may compare the first load drop to the second load drop in order to determine if there is any bias among the members of a particular statistically representative sample 300. If a bias exists among the members of the statistically representative sample 300, then the statistical sampling module 104 may calculate a bias offset value and apply this offset value to the subgroups of the sample 300 in block 555. The sub-process 420/440 then returns to either step 425 of FIG. 4 or step 405 of FIG. 4.

With method 400 and system 100, data from these statistically representative samples 300 allow a demand response program administrator to determine whether additional resources are necessary to provide a required load reduction. In the worst case, resources must be purchased in real time. Only by getting real time or near real time measurements can the administrator insure that there is sufficient load shed to meet energy requirements during a peak period.

The word "exemplary" is used in this description to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a tangible computer-readable medium. Computer-readable media include both tangible computer storage media and tangible communication media including any tangible medium that facilitates transfer of a computer program from one place to another. A tangible computer storage media may be any available tangible media that may be accessed by a computer. By way of example, and not limitation, such tangible computer-readable media may comprise RAM, ROM, EEPROM, CD-ROM or other optical disk storage, magnetic disk storage or other magnetic storage devices, or any other tangible medium that may be used to carry or store desired program code in the form of instructions or data structures and that may be accessed by a computer.

Also, any connection is properly termed a tangible computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, and DSL are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A computer implemented method for estimating energy consumption of an entire utility population of participants in a demand response program by sampling meters of statistically representative groups at different time intervals, the method comprising:
    a processor for organizing the entire utility population comprising energy consumers into a plurality of groups, wherein each member of a group has one or more similar features that relate to a single utility, each member having a meter for measuring consumption of the single utility and which is coupled only to a meter-based communications network in which each meter comprises an antenna for radio-frequency communications;
    a processor for calculating a distribution of energy consumption against the plurality of groups;
    a processor for forming the statistically representative groups based on the distribution of energy consumption and the plurality of groups, a total number of members for all of the statistically representative groups having a magnitude which is smaller than the total utility population of all participants in the demand response program, each statistically representative group is formed such that when energy measurements for members of the statistically representative groups are added together to produce a group total, an estimated performance for the entire utility population is calculated by the processor from the group total;
    a processor for collecting data from the statistically representative groups at predefined time intervals from the meters coupled to the meter-based communications network, the data collected from the meters of the statistically representative groups being less than collecting data from the entire utility population, the processor collects the data from each statistically representative group at a designated different single predefined time interval relative to each statistically representative group within all of the statistically representative groups, the processor collecting data from meters of each statistically representative group at a different predefined time interval and the processor collecting data from only meters of statistically representative groups instead of the entire utility population substantially reduces communications bandwidth consumed by the processor over the meter-based communications network while also reducing a number of calculations needed to estimate energy consumption of the entire utility population; and
    a processor for estimating energy consumption of the entire utility population based on the data collected from the meters of the statistically representative groups.

2. The method of claim 1, wherein the communications network comprises an advanced metering infrastructure (AMI) network.

3. The method of claim 2, wherein the AMI network comprises at least one of an RF mesh network, a PLC network, and a paging network.

4. The method of claim 2, wherein the AMI network comprises meters of group members equipped with wireless radios or PLC transceivers.

5. The method of claim 1, further comprising a processor for adjusting each statistically representative group for bias.

6. The method of claim 5, further comprising a processor for dividing each statistically representative group in to a plurality of subgroups.

7. The method of claim 6, further comprising a processor for applying cycling commands to at least one of the subgroups for reducing an electrical load.

8. The method of claim 6, further comprising a processor for applying a temperature offset to thermostats in at least one of the subgroups for reducing an electrical load.

9. The method of claim 1, wherein organizing the utility population comprising energy consumers into a plurality of groups further comprises organizing the utility population according to at least one of the following parameters: energy consumption of a HVAC system; type of heating, ventilating, air-conditioning (HVAC) equipment; size of HVAC equipment; age of HVAC equipment; percentage of exposure to sunlight for each climate controlled space coupled to the HVAC equipment for a particular HVAC system; and the size of each climate controlled space for a particular HVAC system.

10. The method of claim 1, further comprising a processor for issuing cycling commands to one or more members of the utility population.

11. The method of claim 10, further comprising a processor for calculating energy savings based on the issuance of cycling commands.

12. The method of claim 1, further comprising a processor for applying a temperature offset to thermostats in at least one of the subgroups for reducing an electrical load.

13. A computer program product comprising a non-transitory computer usable medium having a computer readable program code embodied therein, said computer readable program code adapted to be executed to implement a method for estimating energy consumption of an entire utility population of participants in a demand response program by sampling statistically representative groups at different time intervals, said method comprising:

organizing the entire utility population comprising energy consumers into a plurality of groups, wherein each member of a group has one or more similar features that relate to a single utility, each member having a meter for measuring consumption of the single utility and which is coupled only to a meter-based communications network in which each meter comprises an antenna for radio-frequency communications;

calculating a distribution of energy consumption against the plurality of groups;

forming statistically representative groups based on the distribution of energy consumption and the plurality of groups, a total number of members for all of the statistically representative groups having a magnitude which is smaller than the total utility population of all participants in the demand response program, each statistically representative group is formed such that when energy measurements for members of the statistically representative groups are added together to produce a group total, an estimated performance for the entire utility population is calculated from the group total;

collecting data from the statistically representative groups at predefined intervals from the meters coupled to the meter-based communications network, the data collected from the meters of the statistically representative groups being less than collecting data from the entire utility population, the processor collects the data from each statistically representative group at a designated different single predefined time interval relative to each statistically representative group within all of the statistically representative groups, the processor collecting data from meters of each statistically representative group at a different predefined time interval and the processor collecting data from only meters of statistically representative groups instead of the entire utility population substantially reduces communications bandwidth consumed by the processor over the meter-based communications network while also reducing a number of calculations needed to estimate energy consumption of the entire utility population; and estimating energy consumption of the entire utility population based on the data collected from the meters of the statistically representative groups.

14. The computer program product of claim 13, wherein the communications network comprises an advanced metering infrastructure (AMI) network.

15. The computer program product of claim 14, wherein the AMI network comprises at least one of an RF mesh network, a PLC network, and a paging network.

16. The computer program product of claim 14, wherein the AMI network comprises meters of group members equipped with wireless radios or PLC transceivers.

17. The computer program product of claim 13, wherein the program code implementing the method further comprises adjusting each statistically representative group for bias.

18. The computer program product of claim 13, wherein the program code implementing the method further comprises dividing each statistically representative group in to a plurality of subgroups.

19. The computer program product of claim 18, wherein the program code implementing the method further comprises applying cycling commands to at least one of the subgroups for reducing an electrical load.

20. The computer program product of claim 18, wherein the program code implementing the method further comprises applying a temperature offset to at least one of the subgroups for reducing an electrical load.

* * * * *